(12) United States Patent
Lee et al.

(10) Patent No.: US 12,504,285 B2
(45) Date of Patent: Dec. 23, 2025

(54) SYSTEM AND METHOD FOR ESTIMATING DRIFT PATH OF MARINE FLOATING BODY

(71) Applicant: Korea Institute of Ocean Science & Technology, Busan (KR)

(72) Inventors: Moonjin Lee, Daejeon (KR); Yong Myung Kim, Daejeon (KR); Tae Sung Kim, Daejeon (KR)

(73) Assignee: Korea Institute of Ocean Science & Technology, Busan (KR)

( * ) Notice: Subject to any disclaimer, the term of this patent is extended or adjusted under 35 U.S.C. 154(b) by 152 days.

(21) Appl. No.: 18/193,435

(22) Filed: Mar. 30, 2023

(65) Prior Publication Data

US 2023/0314144 A1    Oct. 5, 2023

(30) Foreign Application Priority Data

Apr. 5, 2022    (KR) .......................... 10-2022-0042337

(51) Int. Cl.
*G01C 21/20*    (2006.01)

(52) U.S. Cl.
CPC .................................. *G01C 21/203* (2013.01)

(58) Field of Classification Search
CPC .... G01C 21/203; G01C 21/16; G01C 13/006; G06F 30/20; G06F 16/29; G06F 2113/08; G01W 1/02; G06Q 50/26
See application file for complete search history.

(56) References Cited

FOREIGN PATENT DOCUMENTS

| KR | 10-1821303 B1 | 1/2018 |
|---|---|---|
| KR | 10-2005311 B1 | 7/2019 |

OTHER PUBLICATIONS

Haiwen Tu, Xiaodi Wang, Lin Mu, Kai Xia, "Predicting drift characteristics of persons-in-the-water in the South China Sea", Ocean Engineering, vol. 242, 2021, 110134, ISSN 0029-8018, https://doi.org/10.1016/j.oceaneng.2021.110134 (Year: 2021).*

* cited by examiner

*Primary Examiner* — Brian P Sweeney
(74) *Attorney, Agent, or Firm* — Knobbe, Martens, Olson & Bear, LLP (57) ABSTRACT

A system and method for estimating a drift path of a marine floating body may achieve a quick and accurate search and contribute to minimizing damage because the system and method can consider both left drift and right drift with respect to a wind direction. The system and method may simulate drift (Leeway) of a marine floating body with respect wind in consideration of both of a Downwind Component of Leeway (DWL) and a Crosswind Component of Leeway (CWL) using Monte Carlo technique, and by creating signs (+/−) by applying a uniform random number to the CWL. The system and method may more accurately estimate a path with a relatively simple configuration and at a relatively low cost.

10 Claims, 6 Drawing Sheets

SYSTEM AND METHOD FOR ESTIMATING DRIFT PATH OF MARINE FLOATING BODY

CROSS-REFERENCE TO RELATED APPLICATION

The present application claims priority to Korean Patent Application No. KR 10-2022-0042337, filed Apr. 5, 2022, the entire contents of which are incorporated herein for all purposes by this reference.

BACKGROUND

The present disclosure relates to an apparatus and method for estimating a drift path of a marine floating body that drifts on the sea.

SUMMARY

One aspect is a system and method for estimating a drift path of a marine floating body, the system and method being configured to be able to more accurately estimate a path than the related art because the system and method are configured to perform a process of estimating a drift path in two directions through a computer or hardware by numerically simulating a drift path in consideration of all of drift characteristics in a left direction and a right direction with respect to a wind direction, in order to solve the problems with apparatuses and methods for estimating a drift path of a marine floating body in the related art that have a limitation that when estimating a drift path for searching for a marine floating body, for example, in a situation of searching for missing people or disabled ships in a marine accident, it is required to consider both of left drift and right drift with respect to the direction of wind because when a floating body is drifted on the sea by wind, the floating body drifts left or right at a certain angle with respect to the direction of wind, depending on elapse of time and a wind speed, but, the apparatuses and methods of the related art cannot estimate an accurate drift path because they are generally configured to simulate a drift path in only one direction to the left or the right.

Another aspect is a system and method for estimating a drift path of a marine floating body, the system and method being configured to be able to more accurately estimate a path with a relatively simple configuration and at a relatively low cost in comparison to the existing methods of estimating the drift path of a marine floating body because the system and method are configured to be able to consider both left drift and right drift with respect to a wind direction by simulating drift (Leeway) of a marine floating body with respect wind in consideration of both of a Downwind Component of Leeway (DWL) and a Crosswind Component of Leeway (CWL), for example, using Monte Carlo technique, and by creating signs (+/−) by applying a uniform random number to the CWL, in order to solve the problems with apparatuses and methods for estimating a drift path of a marine floating body in the related art that have a limitation that they cannot estimate an accurate drift path because they are configured to simulate a drift path in only one direction to the left or the right, as described above.

Another aspect is a system and method for estimating a drift path of a marine floating body, the system and method being configured to enable a more quick and accurate search by being applied to a search for missing people or disabled ships when a marine accident occurs, and accordingly, configured to be able to minimize casualties and property damage when a marine accident occurs because the system and method are configured to be able to more accurately estimate a path with a relatively simple configuration and at a relatively low cost in comparison to existing methods by simulating a drift path in consideration of all of drift characteristics in a left direction and a right direction with respect to a wind direction, as described above.

An objective of the present disclosure is to propose a system and method for estimating a drift path of a marine floating body, the system and method being configured to be able to more accurately estimate a path than the related art because the system and method are configured to perform a process of estimating a drift path in two directions through a computer or hardware by numerically simulating a drift path in consideration of all of drift characteristics in a left direction and a right direction with respect to a wind direction, in order to solve the problems with apparatuses and methods for estimating a drift path of a marine floating body in the related art that have a limitation that the apparatuses and methods of the related art cannot estimate an accurate drift path because they are generally configured to simulate a drift path in only one direction to the left or the right.

Further, another objective of the present disclosure is to propose a system and method for estimating a drift path of a marine floating body, the system and method being configured to be able to more accurately estimate a path with a relatively simple configuration and at a relatively low cost in comparison to the existing methods of estimating the drift path of a marine floating body because the system and method are configured to be able to consider both left drift and right drift with respect to a wind direction by simulating drift (Leeway) of a marine floating body with respect wind in consideration of both of a Downwind Component of Leeway (DWL) and a Crosswind Component of Leeway (CWL), for example, using Monte Carlo technique, and by creating signs (+/−) by applying a uniform random number to the CWL, in order to solve the problems with apparatuses and methods for estimating a drift path of a marine floating body in the related art that have a limitation that they cannot estimate an accurate drift path because they are configured to simulate a drift path in only one direction to the left or the right, as described above.

Further, another objective of the present disclosure is to propose a system and method for estimating a drift path of a marine floating body, the system and method being configured to enable a more quick and accurate search by being applied to a search for missing people or disabled ships when a marine accident occurs, and accordingly, configured to be able to minimize casualties and property damage when a marine accident occurs because the system and method are configured to be able to more accurately estimate a path with a relatively simple configuration and at a relatively low cost in comparison to existing methods by simulating a drift path in consideration of all of drift characteristics in a left direction and a right direction with respect to a wind direction, as described above.

In order to achieve the objectives described above, according to the present disclosure, there is provided a system for estimating a drift path of a marine floating body, the system including: a data collector configured to perform a process of collecting various data for estimating a drift path of a marine floating body; a drift path estimator configured to perform a process of estimating a drift path of the marine floating body in two directions to a left and a right on the basis of the data collected by the data collector; an output unit configured to perform a process of outputting various items of information including an estimation result by the drift path estimator and a processing process and a processing result of the entire system; and a controller configured to perform a process of controlling operation of the entire system.

The system may further include a communication unit configured to perform a process of transmitting and receiving various data by communicating with an external device through at least one of wired or wireless communication type.

Further, the data collector may be configured to perform a process of receiving various data, which include information about the marine floating body including a size, weight, and a kind of the marine floating body and environment information including a current, a wind direction, and a wind velocity at a drift area, through a specific input unit or of receiving various data through wired or wireless communication from the outside through the communication unit and then storing the data in a database.

Further, the drift path estimator may be configured to estimate a left drift path and a right drift path of the marine floating body with respect to a wind direction by simulating drift (Leeway) of the marine floating body with respect to wind using a simulation technique including a Monte Carlo algorithm, by applying both of a Downwind Component of Leeway (DWL) and a Crosswind Component of Leeway (CWL) in this case, and by creating signs (+/−) by applying a uniform random number to the CWL.

Further, the drift path estimator may be configured to perform a process of estimating a left drift path and a right drift path of the marine floating body with respect to a wind direction using the following equation, Leeway($L$)=DWL±CWL DWL=α×Gaussian Random Number×$W$ CWL=β×Gaussian Random Number×Sign(+/−)×$W$ (where DWL is a Downwind Component of Leeway, CWL is a Crosswind Component of Leeway, W is a wind velocity, and α and β are constants that are determined through drift tests on the sea), and
the Sign(+/−) may be configured be determined as "−" when the Gaussian random number is less than a predetermined reference value, and determined as "+" when the Gaussian random number is the predetermined reference value or more.

Further, the output unit may be configured to perform a process of visually showing a drift path estimated through the drift path estimator through a display unit including a monitor or a display.

Further, the controller may be configured to perform a process of displaying map information showing an estimation drift path of the marine floating body through the output unit by showing the estimation drift path of the marine floating body estimated by the drift path estimator on a map using pre-stored map information or in cooperation with an electronic navigation chart system on a ship or an external map information system.

Further, the controller may be configured to perform a process of displaying map information showing an estimation drift path of the marine floating body through the output unit by showing the estimation drift path of the marine floating body estimated by the drift path estimator on a map using pre-stored map information or in cooperation with an electronic navigation chart system on a ship or an external map information system, and of transmitting the map information to an external device including a user terminal or a server through the communication unit.

Further, according to the present disclosure, there is provided a method of estimating a drift path of a marine floating body using the system for estimating a drift path of a marine floating body described above, the method including: a data collection step in which a process of collecting various data for estimating a drift path of a marine floating body is performed through the data collector of the system for estimating a drift path; a drift path estimation step in which a process of estimating a drift path of the marine floating body in two directions to a left and a right on the basis of the data collected by the data collector is performed through the drift path estimator of the system for estimating a drift path; and an output step in which a process of outputting various items of information including processing processes and processing results of the data collection step and the drift path estimation step is performed through the output unit of the system for estimating a drift path.

Further, according to the present disclosure, there is provided a system for tracking a marine floating body to perform a process of estimating and tracking a drift path of a marine floating body, the system including: several drift path estimation system each installed on a ship or at an area and configured to perform a process of estimating and monitoring a drift path of a floating body on the sea in accordance with predetermined setting or an external control signal; a control server configured to perform a process of constructing big data about a marine floating body and a drift path by receiving and storing various data from the drift path estimation systems in accordance predetermined setting and of providing various items of corresponding information in a customer-fit type in accordance with a request from a user; and user terminals configured to perform a process of transmitting and receiving various data by communicating with the drift path estimation systems, respectively, and the control server so that each user checks information about a drift path of a floating body and requests and receives desired information, in which the drift path estimation systems are configured to perform a process of transmitting various data, which are obtained by estimating and monitoring a drift path of a marine floating body at respective positions, to the control server using the system for estimating a drift path of a marine floating body described above.

In this configuration, the user terminals each may be configured by installing an exclusive application in an information processing device including a PC or a laptop, or a personal mobile information communication device including a smartphone or a tablet PC.

Further, according to the present disclosure, there is provided a method of tracking a marine floating body, the method including: a tracking network construction step of constructing a network for tracking a marine floating body by installing a drift path estimation system for estimating and monitoring a drift path of a marine floating body on each ship or at each area; and a marine floating body tracking step of performing a process of estimating and tracking a drift path of a marine floating body through the drift path estimation systems installed through the tracking network construction step, in which the drift path estimation systems are each configured using the system for estimating a drift path of a marine floating body described above.

According to the present disclosure, there is provided a system and method for estimating a drift path of a marine floating boy, the system and method being configured to perform a process of estimating a drift path of a marine floating body in two directions through a computer or exclusive hardware in consideration of both left drift and right drift with respect to a wind direction by simulating drift of the marine floating body with respect wind in consideration of both of a DWL and a CWL using Monte Carlo technique and by creating signs (+/−) by applying a uniform random number to the CWL. Therefore, it is possible to provide a more accurate drift path estimation result with a relatively simple configuration and at a relatively low cost in comparison to the existing methods.

Further according to the present disclosure, there is provided a system and method for estimating a drift path of a marine floating body, the system and method being configured to be able to more accurately estimate a path with a relatively simple configuration and at a relatively low cost in comparison the related art by simulating a drift path in consideration of all of drift characteristics in a left direction and a right direction with respect to a wind direction, whereby it is possible to solve the problems with apparatuses and methods for estimating a drift path of a marine floating body in the related art that have a limitation that the apparatuses and methods of the related art cannot estimate an accurate drift path because they are generally configured to simulate a drift path in only one direction to the left or the right.

Further, according to the present disclosure, there is provided a system and method for estimating a drift path of a marine floating body, the system and method being configured to be able to more accurately estimate a path with a relatively simple configuration and at a relatively low cost in comparison to existing methods by simulating a drift path in consideration of all of drift characteristics in a left direction and a right direction with respect to a wind direction, whereby it is possible to enable a more quick and accurate search by being applied to a search for missing people or disabled ships when a marine accident occurs, and accordingly, it is possible to minimize casualties and property damage when a marine accident occurs.

BRIEF DESCRIPTION OF THE DRAWINGS

The above and other objectives, features and other advantages of the present disclosure will be more clearly understood from the following detailed description when taken in conjunction with the accompanying drawings.

DETAILED DESCRIPTION

Recently, as marine accidents such as a collision, sinking, or drift of ships increase, a method for minimizing damage when such marine accidents occur is being increasingly required.

That is, when a ship cannot sail itself and drifts due to a certain reason or when a person or an object drops from a ship and drifts, it is important to find and rescue the person or take back the object within a short time. In order to quickly and efficiently search for missing people or disabled ships on the sea, as described above, it is required to accurately estimate the drift path over time from the initial point in time of drift of floating objects that are drifted by wind on the sea.

As an example of an apparatus and method for estimating a drift path of a floating body that is drifted by wind on the sea in the related art, first, for example, there is a "Method for analyzing drift path of floating matters" disclosed in Korean Patent No. 10-2005311.

In more detail, Korean Patent No. 10-2005311 described above relates to a method for analyzing a drift path of floating objects, the method including: a step of receiving current estimation information and real-time water temperature estimation information; a step of receiving floating object information according to a desired floating object classification; and a step of estimating the location of a floating object using the current estimation information and the water temperature estimation information in accordance with the type of the floating object, and the method being configured to be able to estimate the drift path of a floating object by receiving or estimating weather information and water temperature information on the sea in real time, perform tracking according to the classification of a floating object, and particularly, estimate that a floating object floats under water when the floating object is a sinking object.

Further, as another example of an apparatus and method for estimating a drift path of a floating body that is drifted by wind on the sea in the related art, for example, there is a "System and method for estimating object motion using the particle tracking model of differential wind coefficient mode" disclosed in Korean Patent No. 10-1821303.

In more detail, Korean Patent No. 10-1821303 described above relates to a system and method for estimating object motion using the particle tracking model of differential wind coefficient mode, the system and method including: a particle tracking model constructor that constructs a particle tracking model by evaluating the accuracy of drift estimation on the basis of the ratio of a floating buoy positioning within an estimation result reference radius by calculating a distance difference between a particle tracking estimation result at every hour and the position of the buoy at the same time; an accident information input unit and a weather information input unit that receive accident information and weather information for estimating object motions on the sea; a search area setter that sets a search area on the basis of the input accident information and weather information; a grid flow speed information calculator that calculates grid flow speed information in the set search area; a grid wind information calculator that calculates grid wind information in the set search area; a wind coefficient calculator that calculates a wind coefficient value according to the intensity of wind; a particle tracking model executor that executes the particle tracking model by applying the grid flow speed information, the grid wind information, and the calculated wind coefficient; and a target object motion estimator that estimates motion of a tracking target object on the basis of the execution result by the particle tracking model executor, the system and method being configured to be able to increase the accuracy of object tracking by tracking the object and estimating motion of the object by applying different wind coefficients in accordance with the intensity of wind when executing the particle tracking model.

As described above, various apparatuses and methods for estimating the drift path of a floating body that is drifted by wind on the sea have been proposed in the related art, but these apparatuses and methods of the related art described above have the following limitation.

That is, a drift path that is changed over time and by influence of wind should be accurately reflected to estimate the drift path of a floating body that is drifted by wind on the sea in order to search for missing people or disabled ships, as described above, but Korean Patent Application No. 10-2005311 described above proposes only a configuration that estimates the drift path of a floating body by reflecting current estimation information and water temperature information on the sea, so there is a limitation that influence of wind is not considered.

Further, Korean Patent Application No. 10-1821303 can increase the accuracy of object tracking by tracking an object and estimating motion of the object by applying different wind coefficients in accordance with the intensity of wind, but has a limitation that influence of wind is not considered.

In more detail, in generally, since marine floating bodies drift left or right at a certain angle with respect to a wind direction, depending on the speed of wind, left drift and right drift both should be considered with respect to the direction of wind when a drift path is estimated to search for marine floating bodies.

However, since the apparatuses and methods for estimating a drift path according to the related art described above are generally configured to simulate a drift path only in one direction of the left or the right, they have a limitation that they cannot accurately estimate a drift path.

Accordingly, in order to remove the limitation in the related art described above, it may be possible to propose a new apparatus and method for estimating a drift path of a marine floating body, the apparatus and method being configured to be able to estimate a drift path in two directions by numerically simulating a drift path in consideration of all of drift characteristics in a left direction and a right direction with respect to a wind direction. However, an apparatus or a method that satisfies all of the requests has not been proposed yet.

Hereafter, a detailed embodiment of a system and method for estimating a drift path of a marine floating body according to the present disclosure is described.

It should be noted that the following description provides just one embodiment for implementing the present disclosure and the present disclosure is not limited only to the embodiment to be described below.

Further, it should be noted that, in the following description of an embodiment of the present disclosure, configurations that are the same as or similar to those in the related art or are determined to easily understood and implement at the level of those skilled in the art are not described in detail for simple description.

That is, the present disclosure, as will be described below, relates to a system and method for estimating a drift path of a marine floating body, the system and method being configured to be able to more accurately estimate a path than the related art because the system and method are configured to perform a process of estimating a drift path in two directions through a computer or hardware by numerically simulating a drift path in consideration of all of drift characteristics in a left direction and a right direction with respect to a wind direction, in order to solve the problems with apparatuses and methods for estimating a drift path of a marine floating body in the related art that have a limitation that the apparatuses and methods of the related art cannot estimate an accurate drift path because they are generally configured to simulate a drift path in only one direction to the left or the right.

Further, the present disclosure, as will be described below, relates to a system and method for estimating a drift path of a marine floating body, the system and method being configured to be able to more accurately estimate a path with a relatively simple configuration and at a relatively low cost in comparison to the existing methods of estimating the drift path of a marine floating body because the system and method are configured to be able to consider both left drift and right drift with respect to a wind direction by simulating drift (Leeway) of a marine floating body with respect wind in consideration of both of a Downwind Component of Leeway (DWL) and a Crosswind Component of Leeway (CWL), for example, using Monte Carlo technique, and by creating signs (+/−) by applying a uniform random number to the CWL, in order to solve the problems with apparatuses and methods for estimating a drift path of a marine floating body in the related art that have a limitation that they cannot estimate an accurate drift path because they are configured to simulate a drift path in only one direction to the left or the right, as described above.

Further, the present disclosure, as will be described below, relates to a system and method for estimating a drift path of a marine floating body, the system and method being configured to enable a more quick and accurate search by being applied to a search for missing people or disabled ships when a marine accident occurs, and accordingly, configured to be able to minimize casualties and property damage when a marine accident occurs because the system and method are configured to be able to more accurately estimate a path with a relatively simple configuration and at a relatively low cost in comparison to existing methods by simulating a drift path in consideration of all of drift characteristics in a left direction and a right direction with respect to a wind direction, as described above.

Hereafter, a system and method for estimating a drift path of a marine floating body according to the present disclosure is described in detail with reference to drawings.

Figure 1:
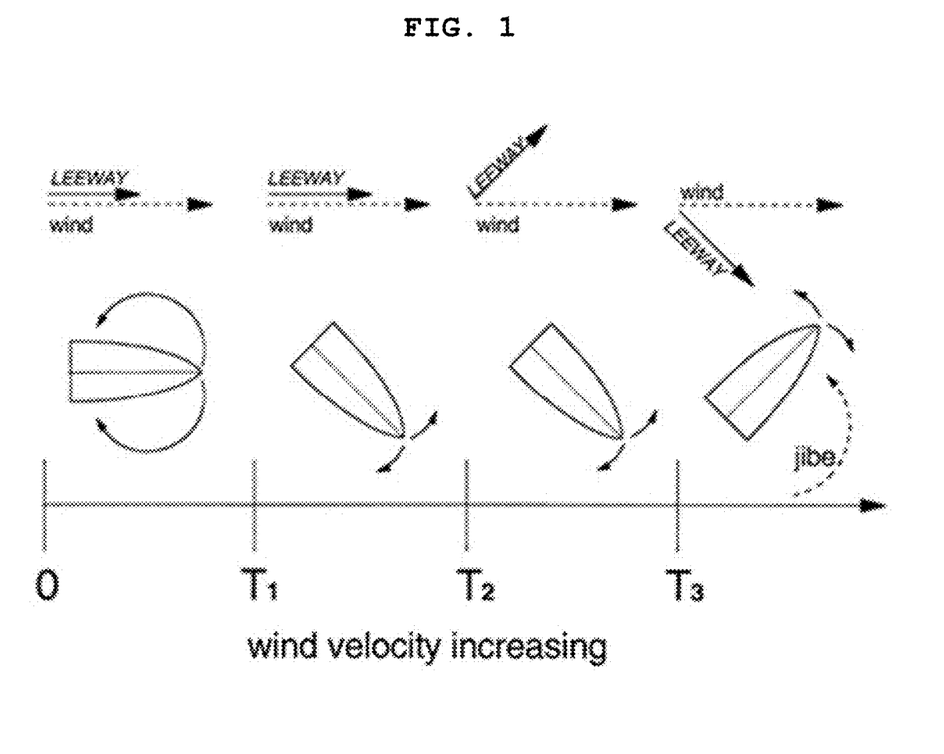
FIG. 1 is a view schematically showing variation of a drift direction according to time and a wind velocity.

In more detail, first, referring to FIG. 1, FIG. 1 is a view schematically showing variation of a drift (Leeway) direction according to time and a wind velocity.

As shown in FIG. 1, a marine floating body is drifted by wind over time, and in this case, the drift direction by wind changes to the left or the right at a certain angle with respect to the wind direction, depending on the velocity of the wind.

Accordingly, it is impossible to estimate an accurate drift path unless estimating drift in the left direction and drift in the right direction with respect to the direction of wine when estimating a drift path for searching for a marine floating body.

Figure 2:
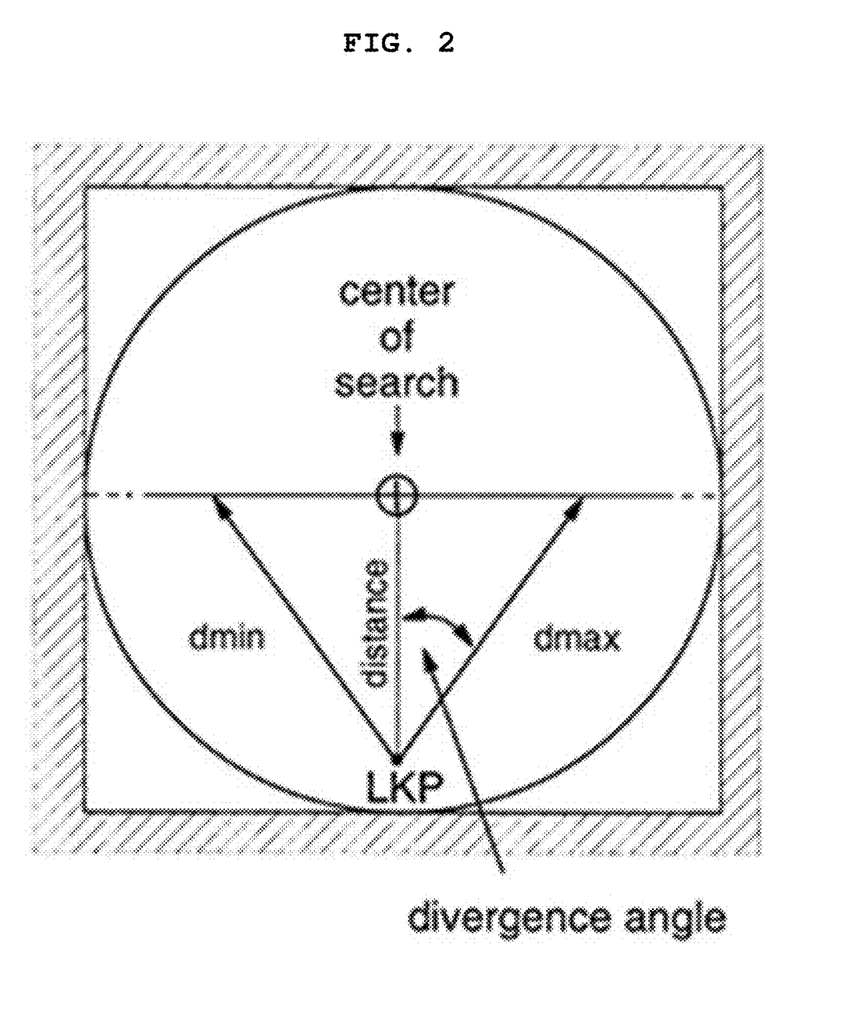
FIG. 2 is a view schematically showing a divergence angle to a wind direction center.

That is, referring to FIG. 2, FIG. 2 is a view schematically showing a divergence angle to a wind direction center.

As shown in FIG. 2, a drift path from an initial drift position or a last known position (LKP) progresses to the left or the firth by a divergence angle according to a wind velocity, and the larger the distance from the initial LKP due to an increase of a wind velocity or elapse of time, the larger the range to search from the center of search.

Accordingly, as shown in FIGS. 1 and 2, in order to more quickly and accurately search for a marine floating body, it is required to accurately estimate a flow path of the marine floating body through two-direction drift modeling that considers both of a left direction and a right direction with respect to a wind direction in accordance with a wind velocity.

Accordingly, the present disclosure, as will be described below, proposes a system and method for estimating a drift path of a marine floating body, the system and method being configured to be able to estimate a drift path in two directions by performing numerical simulation by reflecting drift characteristics relative to wind of a marine floating body, as described above.

Figure 3:
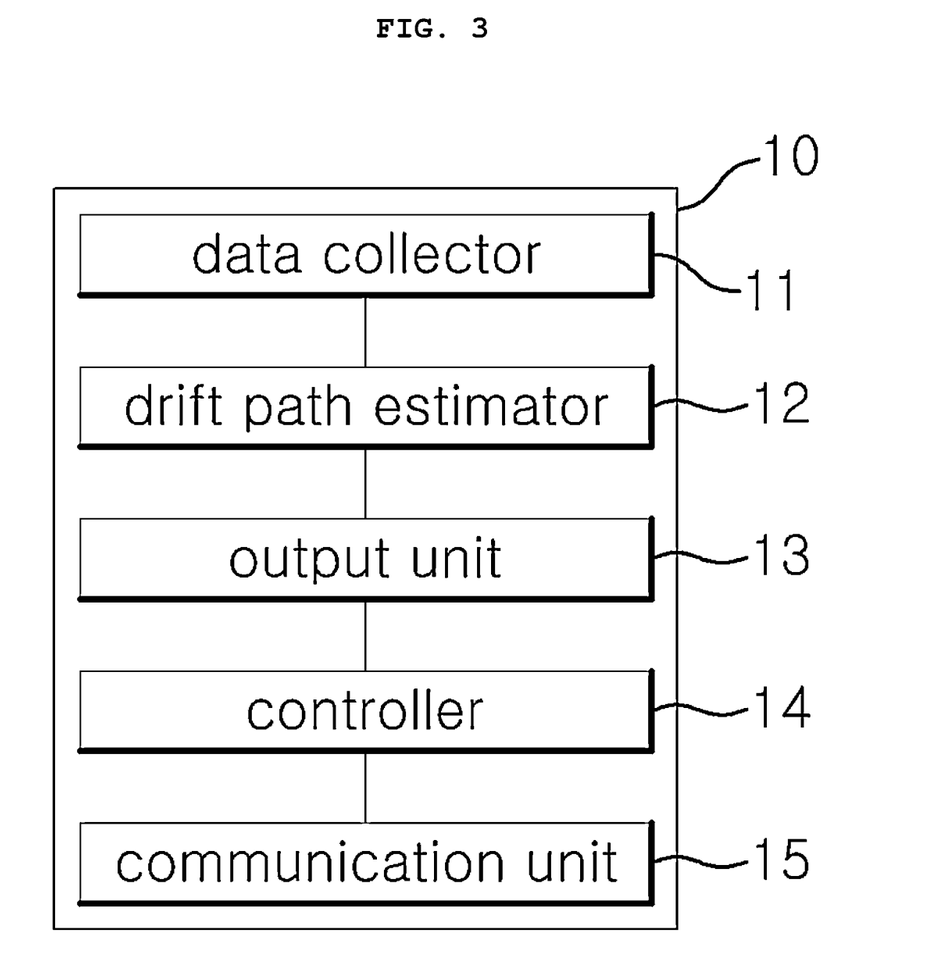
FIG. 3 is a view schematically showing the entire configuration of a system and method for estimating a drift path of a marine floating body according to an embodiment of the present disclosure.

In more detail, referring to FIG. 3, FIG. 3 is a block diagram schematically showing the entire configuration of a system 10 for estimating a drift path of a marine floating body according to an embodiment of the present disclosure.

As shown in FIG. 3, the system 10 for estimating a drift path of a marine floating body according to an embodiment of the present disclosure, in a broad meaning, may include: a data collector 11 configured to perform a process of collecting various data for estimating a drift path of a marine floating body; a drift path estimator 12 configured to perform a process of estimating a drift path relative to a wind direction of the marine floating body in two directions to the left and the right on the basis of the data collected by the data collector 11; an output unit 13 configured to perform a process of outputting various items of information including the estimation result by the drift path estimator 12 and the entire processing process and processing result of the components of the system 10; and a controller 14 configured to perform a process of controlling the general operation of the components and the system 10.

In this configuration, the data collector 11 may be configured to perform a process of receiving various data, which include information about a target marine floating body such as the size, weight, kind, etc. of the marine floating body and environment information such as a current, a wind direction, a wind velocity, etc. at a drift area, through a specific input unit or of receiving various data through wired or wireless communication from the outside and then storing the data in a database.

To this end, the system 10, as shown in FIG. 1, may further include a communication unit 15 configured to perform a process of transmitting and receiving various data by communicating with an external device through at least one of wired or wireless communication type.

Alternatively, the data collector may be configured to perform a process of receiving measurement values measured by sensors by including measurers such as separately installed sensors.

Further, the drift path estimator 12 may be configured to perform a process of estimating a left drift path and a right drift path with respect to a wind direction through simulation using a simulation method such as Monte Carlo technique.

Figure 4:
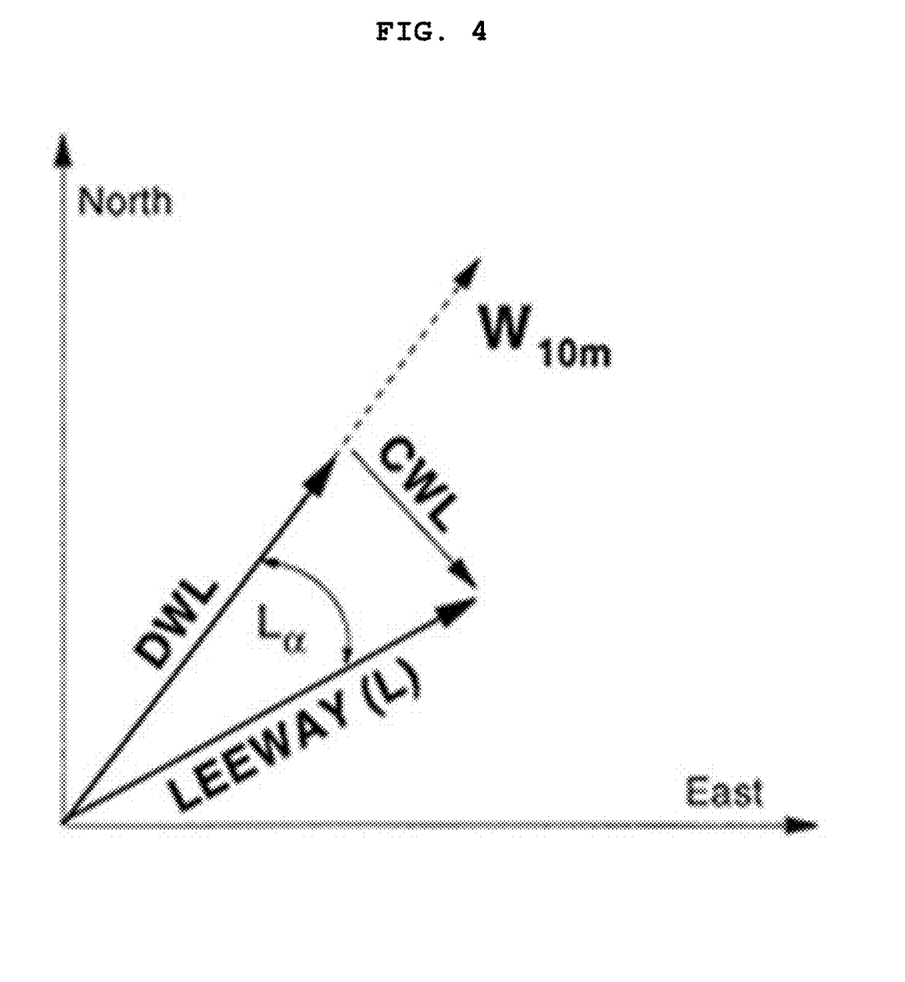
FIG. 4 is a conceptual view schematically showing the entire concept of a method of estimating a drift path of a marine floating body, the method being performed by a drift path estimator of the system for estimating a drift path of a marine floating body according to an embodiment of the present disclosure.

That is, referring to FIG. 4, FIG. 4 is a conceptual view schematically showing the entire concept of a method of estimating a drift path of a marine floating body that is performed by the drift path estimator 12 of the system 10 for estimating a drift path of a marine floating body according to an embodiment of the present disclosure.

As shown in FIG. 4, the drift path estimator 12 may be configured to reflect both of left drift and right drift with respect to a wind direction by simulating drift (Leeway (L)) of a marine floating body with respect to wind in consideration of both of a Downwind Component of Leeway (DWL) and a Crosswind Component of Leeway (CWL) and by creating signs (+/−) by applying a uniform random number to the CWL.

In more detail, as the process of estimating the drift path (L) shown in FIG. 4 may be expressed as the following [Equation 1].

$$\text{Leeway}(L) = \text{DWL} \pm \text{CWL}$$

$$\text{DWL} = \alpha \times W$$

$$\text{CWL} = \beta \times W \qquad \text{[EQUATION 1]}$$

In [Equation 1], DWL is a Downwind Component of Leeway, CWL is a Crosswind Component of Leeway, W is a wind velocity, and $\alpha$ and $\beta$ are constants that are determined through drift tests on the sea.

Further, the process of simulating two-direction drift paths through Monte Carlo technique by the drift path estimator 12 may be performed as in the following [Equation 2].

$$\text{Leeway}(L) = \text{DWL} \pm \text{CWL}$$

$$\text{DWL} = \alpha \times \text{Gaussian Random Number} \times W$$

$$\text{CWL} = \beta \times \text{Gaussian Random Number} \times \text{Sign}(+/-) \times W \qquad \text{[EQUATION 2]}$$

In [Equation 2], the reason of multiplying $\alpha$ and $\beta$ by a Gaussian Random Number is to a regular distribution within the ranges of $\alpha$ and $\beta$ without applying $\alpha$ and $\beta$ as constants.

Further, in [Equation 2], Sign(+/−) may be configured to perform a process of creating a uniform random number, and for example, determining "−" when the uniform random number is less than 0.5, and "+" when the uniform random number is 0.5 or more.

Accordingly, since a uniform random number is applied to Sign(+/−), as described above, estimation of tow-direction drift paths considering drift in the left direction and drift in the right direction with respect to wind can be achieved.

In the embodiment of the present disclosure described above, Monte Carlo technique is widely used in numerical integration, optimization, etc. as a statistical method of calculating the value of function using a random number that is randomly extracted. Accordingly, it should be noted that the matter that those skilled in the art can easily implement by referring to documents of the related art, etc. such as a detailed process of performing simulation using Monte Carlo technique is not described in detail in the present disclosure.

Further, although the present disclosure was described by exemplifying the case of simulating drift of a marine floating body using Monte Carlo technique in an embodiment of the present disclosure, it should be noted that the present disclosure is not necessarily limited to the embodiment, that is, the present disclosure may be changed and modified in various ways, if necessary, by those skilled in the art without departing from the spirit and scope of the present disclosure such as using simulation algorithms other than Monte Carlo technique described above.

Next, the output unit 13 may be configured to perform a process of visually showing a drift path estimated through the drift path estimator 12, as described above, through a display unit such as a monitor or a display.

Figure 5:
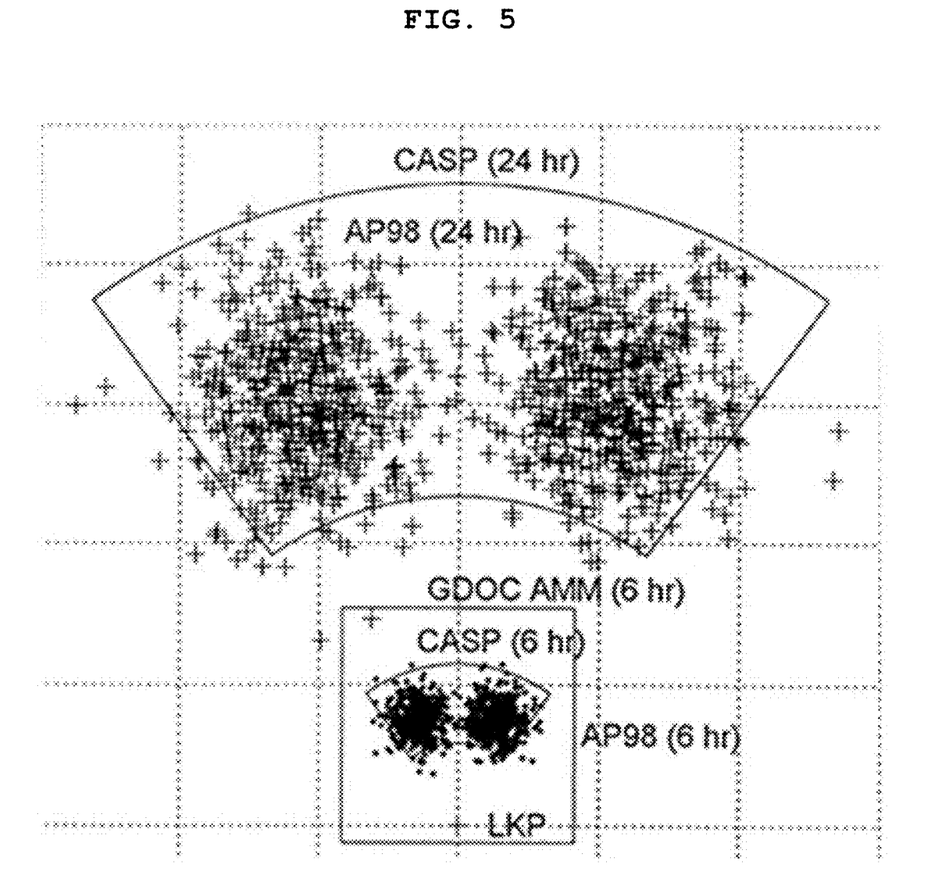
FIG. 5 is a view schematically showing an example of a display image that shows the result of simulating and estimating a drift path of a marine floating body using the system for estimating a drift path of a marine floating body according to an embodiment of the present disclosure.

That is, referring to FIG. 5, FIG. 5 is a view schematically showing an example of a display image that shows the result of simulating and estimating a drift path of a marine floating body using the system for estimating a drift path of a marine floating body according to an embodiment of the present disclosure configured as described above.

As shown in FIG. 5, it can be seen that left and right drift paths from an LKP are simulated and output.

Further, the system 10 may be configured to perform a process of displaying an estimation path of a marine floating body estimated as described above in cooperation with a map information system such as an electronic navigation chart when displaying a drift path.

That is, the controller 14 may be configured to perform a process of displaying an estimation path of a marine floating body estimated by the drift path estimator 12 on a map through the output 13, for example, using pre-stored map information or in cooperation with an electronic navigation chart system.

Further, the controller 14 may be configured to perform a process of displaying an estimation path of a marine floating body estimated by the drift path estimator 12, as described above, on a map through the output unit 13, and simultaneously, of transmitting the estimation path to an external device such as a user terminal or a server through the communication unit 15.

Accordingly, it is possible to implement the system 10 for estimating a drift path of a marine floating body according to an embodiment of the present disclosure, as described above, whereby, according to the present disclosure, it is possible to easily implement a method of estimating a drift path of a marine floating body that is configured to simulate the processing process described above through a computer or exclusive hardware.

Further, according to the present disclosure, it is possible to easily implement a system and method of tracking a marine floating body that remotely provides and traces information about an estimation drift path of a floating body using the system 10 and method for estimating a drift path of a marine floating body according to an embodiment of the present disclosure configured as described above.

Figure 6:
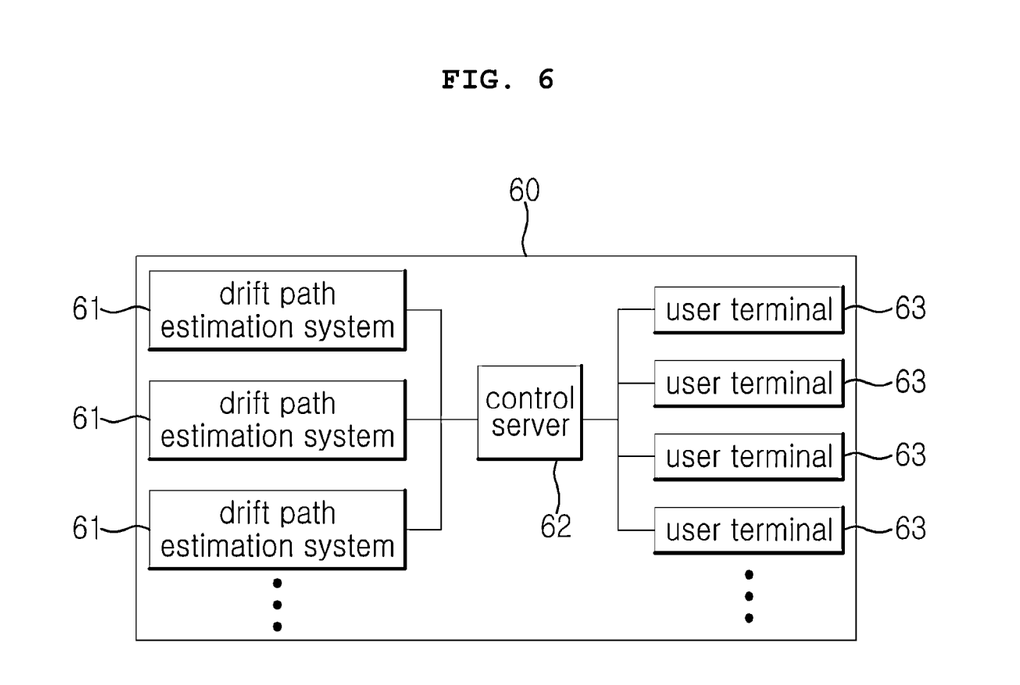
FIG. 6 is a block diagram schematically showing the entire configuration of a system for tracking a marine floating body using the system for estimating a drift path of a marine floating body according to an embodiment of the present disclosure.

That is, referring to FIG. 6, FIG. 6 is a block diagram schematically showing the entire configuration of a system 60 for tracking a marine floating body using the system 10 for estimating a drift path of a marine floating body according to an embodiment of the present disclosure.

As shown in FIG. 6, the system 60 for tracking a marine floating body according to an embodiment of the present disclosure, in a broad meaning, may include: several drift path estimation systems 61 each installed, for example, on a ship or at an area and configured to perform a process of estimating and monitoring a drift path of a floating body on the sea in accordance with predetermined setting or an external control signal; a control server 62 configured to perform a process of constructing big data about a marine floating body and a drift path by periodically receiving and drift path estimation data and monitoring data from the drift path estimation systems 61 in a database, and to provide various items of corresponding information in a customer-fit type in accordance with requests from users; and user terminals 63 configured to perform a process of transmitting and receiving various data by communicating with the drift path estimation systems 61, respectively, and the control server 62 so that each user checks information about a drift path of a floating body and requests and receives desired information.

The drift path estimation systems 61 may be configured to perform a process of transmitting various data, which are obtained by estimating and monitoring a drift path of a floating body at a corresponding position, to the control server 62 using the system 10 for estimating a drift path of a marine floating body according to an embodiment of the present disclosure described above with reference to FIGS. 1 to 5.

Further, it should be understood that the user terminal 63 may be configured in various ways, if necessary, for example, by using a terminal such as a PC or by installing an exclusive application in a personal portable information communication terminal such as a smartphone, a tablet PC, or a laptop.

According to the present disclosure, it is possible to easily construct a large-scale system 60 and method for tracking a marine floating body for a wide area such as a whole country from the configuration described above by installing the drift path estimation system 61 on each ship or at each area and transmitting data obtained by estimating a drift path to the control server 62 from the drift path estimation system 61 at a corresponding position in accordance with a request from the control server 62 or predetermined setting when an object drifts on the seat at a specific area.

Accordingly, it is possible to implement a system and method for estimating a drift path of a marine floating body according to the present disclosure, as described above, whereby, according to the present disclosure, there is provided a system and method for estimating a drift path of a marine floating boy, the system and method being configured to perform a process of estimating a drift path of a marine floating body in two directions through a computer or exclusive hardware in consideration of both left drift and right drift with respect to a wind direction by simulating drift of the marine floating body with respect wind in consideration of both of a DWL and a CWL using Monte Carlo technique and by creating signs (+/−) by applying a uniform random number to the CWL. Therefore, it is possible to provide a more accurate drift path estimation result with a relatively simple configuration and at a relatively low cost in comparison to the existing methods.

Further according to the present disclosure, there is provided a system and method for estimating a drift path of a marine floating body, the system and method being configured to be able to more accurately estimate a path with a relatively simple configuration and at a relatively low cost in comparison the related art by simulating a drift path in consideration of all of drift characteristics in a left direction and a right direction with respect to a wind direction, whereby it is possible to solve the problems with apparatuses and methods for estimating a drift path of a marine floating body in the related art that have a limitation that the apparatuses and methods of the related art cannot estimate an accurate drift path because they are generally configured to simulate a drift path in only one direction to the left or the right.

Further, according to the present disclosure, there is provided a system and method for estimating a drift path of a marine floating body, the system and method being configured to be able to more accurately estimate a path with a relatively simple configuration and at a relatively low cost in comparison to existing methods by simulating a drift path in consideration of all of drift characteristics in a left direction and a right direction with respect to a wind direction, whereby it is possible to enable a more quick and accurate search by being applied to a search for missing people or disabled ships when a marine accident occurs, and accordingly, it is possible to minimize casualties and property damage when a marine accident occurs.

A system and method for estimating a drift path of a marine floating body according to the present disclosure was described above through an embodiment of the present disclosure, but it would be apparent that the present disclosure is not limited to the description of the embodiment, and accordingly, the present disclosure may be changed, modified, combined, replaced, etc. in various ways by those skilled in the art in accordance with requirements in designing and other various factors.

What is claimed is:

1. A system for estimating a drift path of a marine floating body and searching the marine floating body based on an estimated drift path, the system comprising:
    a data collector comprising one or more sensors configured to collect various data for estimating a drift path of a marine floating body, the drift path of the marine floating body configured to change over time by influence of wind;
    a drift path estimator configured to estimate a drift path of the marine floating body in two directions to a left and a right on the basis of the data collected by the data collector;
    an output unit comprising a display device configured to output various items of information including an estimation result by the drift path estimator and a processing process and a processing result of an entire system; and
    a controller configured to control operations of the entire system by:
        controlling the output unit to display the estimated drift path of the marine floating body using an electronic map system such that the estimated drift path shows left and right drift paths of the marine floating body from a last known position of the marine floating body on the electronic map system,
        causing the estimated drift path to be transmitted to an external device, and
        controlling the electronic map system to identify a location of the marine floating body such that the marine floating body is searched based on the identified location on the electronic map system.

2. The apparatus of claim 1, wherein the data collector is configured to: receive various data, which include information about the marine floating body including a size, weight, and a kind of the marine floating body and environment information including a current, a wind direction, and a wind velocity at a drift area, through a specific input unit, or receive various data through wired or wireless communication from the outside and then store the data in a database.

3. The apparatus of claim 1, wherein the drift path estimator is configured to estimate the left drift path and the right drift path of the marine floating body with respect to a wind direction by simulating drift (Leeway) of the marine floating body with respect to wind using a simulation technique including a Monte Carlo algorithm, by applying both of a Downwind Component of Leeway (DWL) and a Crosswind Component of Leeway (CWL) in this case, and by creating signs (+/−) by applying a uniform random number to the CWL.

4. The apparatus of claim 3, wherein the drift path estimator is configured to estimate the left drift path and the right drift path of the marine floating body with respect to a wind direction using a following equation, Leeway($L$)=DWL±CWL DWL=$\alpha$×Gaussian Random Number×$W$ CWL=$\beta$×Gaussian Random Number×Sign(+/−)×$W$ (where DWL is a Downwind Component of Leeway, CWL is a Crosswind Component of Leeway, W is a wind velocity, and $\alpha$ and $\beta$ are constants that are determined through drift tests on the sea), and
wherein the Sign (+/−) is configured be determined as "−" when the Gaussian random number is less than a predetermined reference value, and determined as "+" when the Gaussian random number is the predetermined reference value or more.

5. The apparatus of claim 1, wherein the electronic map system comprises at least one of a map using pre-stored map information, or in cooperation with an electronic navigation chart system on a ship or an external map information system.

6. The apparatus of claim 1, wherein the external device comprises at least one of a user terminal or a server.

7. A method of estimating a drift path of a marine floating body, the method comprising:
    collecting, by a data collector comprising one or more sensors, various data for estimating a drift path of a marine floating body, the drift path of the marine floating body configured to change over time by influence of wind;
    estimating, by a drift path estimator, a drift path of the marine floating body in two directions to a left and a right on the basis of the data collected by the data collector;
    outputting, by an output unit comprising a display device, various items of information including an estimation result by the drift path estimator and a processing process and a processing result of an entire system;
    controlling, by a controller, the output unit to display the estimated drift path of the marine floating body using an electronic map system such that the estimated drift path shows left and right drift paths of the marine floating body from a last known position of the marine floating body on the electronic map system;
    causing, by the controller, the estimated drift path to be transmitted to an external device; and
    controlling, by the controller, the electronic map system to identify a location of the marine floating body such that the marine floating body is searched based on the identified location on the electronic map system.

8. A system for tracking a marine floating body to estimate and track a drift path of a marine floating body, the system comprising:
    a plurality of drift path estimation systems each installed on a ship or at an area and configured to estimate and monitor a drift path of a floating body on the sea in accordance with predetermined setting or an external control signal;
    a control server configured to construct big data about a marine floating body and a drift path by receiving and storing various data from the drift path estimation systems in accordance with the predetermined setting and provide various items of corresponding information in a customer-fit type in accordance with a request from a user; and a plurality of user terminals configured to transmit and receive various data by communicating with the drift path estimation systems, respectively, and the control server so that each user checks information about a drift path of a floating body and requests and receives desired information, wherein the drift path estimation systems are configured to transmit various data, which are obtained by estimating and monitoring a drift path of a marine floating body at respective positions, to the control server using the system for estimating a drift path of a marine floating body and searching the marine floating body based on an estimated drift path, the system comprising:

a data collector comprising one or more sensors configured to collect various data for estimating a drift path of a marine floating body, the drift path of the marine floating body configured to change over time by influence of wind;

a drift path estimator configured to estimate a drift path of the marine floating body in two directions to a left and a right on the basis of the data collected by the data collector;

an output unit comprising a display device configured to output various items of information including an estimation result by the drift path estimator and a processing process and a processing result of an entire system; and a controller configured to control operations of the entire system by:

controlling the output unit to display the estimated drift path of the marine floating body using an electronic map system such that the estimated drift path shows left and right drift paths of the marine floating body from a last known position of the marine floating body on the electronic map system, causing the estimated drift path to be transmitted to an external device, and controlling the electronic map system to identify a location of the marine floating body such that the marine floating body is searched based on the identified location on the electronic map system.

9. The system of claim 8, wherein each of the user terminals is configured by installing an exclusive application in an information processing device including a PC or a laptop, or a personal mobile information communication device including a smartphone or a tablet PC.

10. A method of tracking a marine floating body, the method comprising:

constructing a network for tracking a marine floating body by installing a drift path estimation system for estimating and monitoring a drift path of a marine floating body on each ship or at each area; and estimating and tracking a drift path of a marine floating body through the installed drift path estimation systems, wherein each of the drift path estimation systems is configured to use the system for estimating a drift path of a marine floating body and searching the marine floating body based on an estimated drift path, the system comprising:

a data collector comprising one or more sensors configured to collect various data for estimating a drift path of a marine floating body, the drift path of the marine floating body configured to change over time by influence of wind;

a drift path estimator configured to estimate a drift path of the marine floating body in two directions to a left and a right on the basis of the data collected by the data collector;

an output unit comprising a display device configured to output various items of information including an estimation result by the drift path estimator and a processing process and a processing result of an entire system; and a controller configured to control operations of the entire system by:

controlling the output unit to display the estimated drift path of the marine floating body using an electronic map system such that the estimated drift path shows left and right drift paths of the marine floating body from a last known position of the marine floating body on the electronic map system, causing the estimated drift path to be transmitted to an external device, and controlling the electronic map system to identify a location of the marine floating body such that the marine floating body is searched based on the identified location on the electronic map system.

* * * * *